US012747753B2

(12) United States Patent
Inoue et al.

(10) Patent No.: US 12,747,753 B2
(45) Date of Patent: Sep. 29, 2026

(54) SLIDING MEMBER

(71) Applicant: DAIDO METAL COMPANY LTD., Nagoya (JP)

(72) Inventors: Hirotaka Inoue, Inuyama (JP); Yoshifumi Ito, Inuyama (JP); Takato Koyama, Inuyama (JP)

(73) Assignee: DAIDO METAL COMPANY LTD., Nagoya (JP)

(*) Notice: Subject to any disclaimer, the term of this patent is extended or adjusted under 35 U.S.C. 154(b) by 102 days.

(21) Appl. No.: 18/607,442

(22) Filed: Mar. 16, 2024

(65) Prior Publication Data

US 2024/0328458 A1 Oct. 3, 2024

(30) Foreign Application Priority Data

Mar. 31, 2023 (JP) ................................ 2023-057229

(51) Int. Cl.
*F16C 33/12* (2006.01)

(52) U.S. Cl.
CPC .......... *F16C 33/125* (2013.01); *F16C 33/128* (2013.01); *F16C 2202/04* (2013.01); *F16C 2204/20* (2013.01); *F16C 2208/32* (2013.01)

(58) Field of Classification Search
CPC .............. F16C 2202/04; F16C 2204/20; F16C 2208/32; F16C 33/125; F16C 33/128; F16C 2202/54; F16C 2208/02; F16C 2240/60; F16C 33/1095; F16C 33/201; F16C 33/203; F16C 33/206; F16C 33/208
See application file for complete search history.

(56) References Cited

U.S. PATENT DOCUMENTS 12,196,262 B2 * 1/2025 Yamamoto ............ F16C 33/104
2016/0273583 A1 * 9/2016 Iwata .................... F16C 33/201

FOREIGN PATENT DOCUMENTS

JP 2019-108438 A 7/2019
JP 2021012342 A 2/2021
WO WO-2012/147781 A1 11/2012
WO WO-2019198311 A1 * 10/2019 .............. F16C 33/20

OTHER PUBLICATIONS

Office Action dated Jun. 16, 2026 in corresponding JP Application No. 2023-057229.

* cited by examiner

*Primary Examiner* — Lynda Salvatore
(74) *Attorney, Agent, or Firm* — Harness, Dickey & Pierce, P.L.C.

(57) ABSTRACT

A sliding member comprising a back metal layer, and a sliding layer, wherein the sliding layer contains a resin material, a surface of the sliding layer is an exposed sliding surface, and the sliding layer has Martens hardness of 25 to 45 $N/mm^2$ and a creep deformation ratio of 10% to 30%.

13 Claims, 4 Drawing Sheets

SLIDING MEMBER

CROSS-REFERENCE TO RELATED APPLICATIONS

This application claims the benefit and priority of JP 2023-057229, filed Mar. 31, 2023. The entire disclosure of the above application is incorporated herein by reference.

BACKGROUND OF THE INVENTION

1. Field of the Invention

The present invention generally relates to a sliding member and more specifically relates to a sliding member of a sliding bearing.

2. Description of the Related Art

It is desirable that a sliding member of a sliding bearing used for a shock absorber of an automobile and the like has a difference between a static frictional force and a dynamic frictional force as small as possible in order to improve riding comfort of a passenger. Conventionally, it is known that the static frictional force and the dynamic frictional force of the sliding member can be increased or decreased by adjusting a component and an amount of an additive added to a sliding layer of the sliding member.

JP-A-2019-108438 discloses a sliding member that can increase a static frictional force and control a relationship between the static frictional force and a dynamic frictional force by allowing a resin composition forming a sliding layer to contain a predetermined amount of pitch-based carbon fiber. Examples describe that a change rate of the static frictional force and the dynamic frictional force can be reduced to 20% or smaller by changing compositions of a fluororesin, a pitch-based carbon fiber, an aramid fiber, an iron oxide, molybdenum disulfide, graphite, zinc (alloy), and additives other than resin.

WO 2012/147781 discloses a sliding member capable of controlling a relationship between a static frictional force and a dynamic frictional force by forming an uneven surface on a sliding surface to suppress formation of an oil film. It is disclosed that, by forming the uneven surface on the sliding surface, a change rate of the dynamic frictional force with respect to the static frictional force can be suppressed to be small as compared with a case where the sliding surface is smooth.

SUMMARY OF THE INVENTION

The sliding member of JP-A-2019-108438 reduces the change rate of the static frictional force and the dynamic frictional force by changing the composition of the sliding layer, but an effect thereof is no more than 20%. In a case where the sliding member is used for a shock absorber of an automobile and the like, it is necessary to make a difference between the static frictional force and the dynamic frictional force smaller in order to further improve riding comfort and driving stability of a passenger. In the sliding member of WO 2012/147781, there is a possibility that a shape of unevenness is lost as the sliding surface wears, and the control of the static frictional force and the dynamic frictional force is impaired.

Therefore, an object of the present invention is to provide a sliding member including a sliding layer in which a difference between a static frictional force and a dynamic frictional force is suppressed to be small regardless of a degree of progress of wear.

In order to achieve the above-described object, according to the present invention, provided is a sliding member comprising a back metal layer, and a sliding layer, wherein the sliding layer contains a resin material, a surface of the sliding layer is an exposed sliding surface, and the sliding layer has Martens hardness of 25 to 45 $N/mm^2$ and a creep deformation ratio of 10% to 30%.

Preferably, the sliding layer contains porous metal, and pores of the porous metal are impregnated with the resin material.

Preferably, the porous metal is exposed on the sliding surface of the sliding layer.

Preferably, the porous metal is not exposed on the sliding surface of the sliding layer.

Preferably, the sliding layer further contains a hard particle.

Preferably, the sliding layer further contains a solid lubricant.

Preferably, the resin material is made of polytetrafluoroethylene (PTFE).

Preferably, the hard particle contains alumina ($Al_2O_3$).

Preferably, the solid lubricant contains molybdenum disulfide ($MoS_2$).

Preferably, the sliding layer has a thickness of 0.1 to 0.7 mm.

Preferably, the porous metal has an average particle size of 30 to 110 μm.

Preferably, the back metal layer has a thickness of 0.3 to 3.5 mm.

Preferably, the creep deformation ratio of the sliding layer is 15% to 25%.

According to the present invention, by adjusting Martens hardness of a sliding layer to 25 to 45 $N/mm^2$ and a creep deformation ratio thereof to 10% to 30%, it is possible to provide a sliding member in which a difference between a static frictional force and a dynamic frictional force of a sliding surface is suppressed to be small. Even in a case where wear of the sliding surface progresses, the Martens hardness and the creep deformation ratio of the sliding layer do not change, so that the static frictional force, the dynamic frictional force, and the difference between the static frictional force and the dynamic frictional force of the sliding surface are constant, and performance as the sliding member is maintained.

The invention and its advantages will be hereinafter described in further detail with reference to the accompanying drawings. The drawings illustrate non-limiting embodiments only for illustrative purposes.

DESCRIPTION OF THE EMBODIMENTS

Hereinafter, embodiments of the present invention will be described with reference to the drawings, but the present invention is not limited to these embodiments.

A structure and a manufacturing method of a sliding member 1 according to one embodiment of the present invention will be hereinafter described in detail.

(Structure of Sliding Member)

Figure 1:
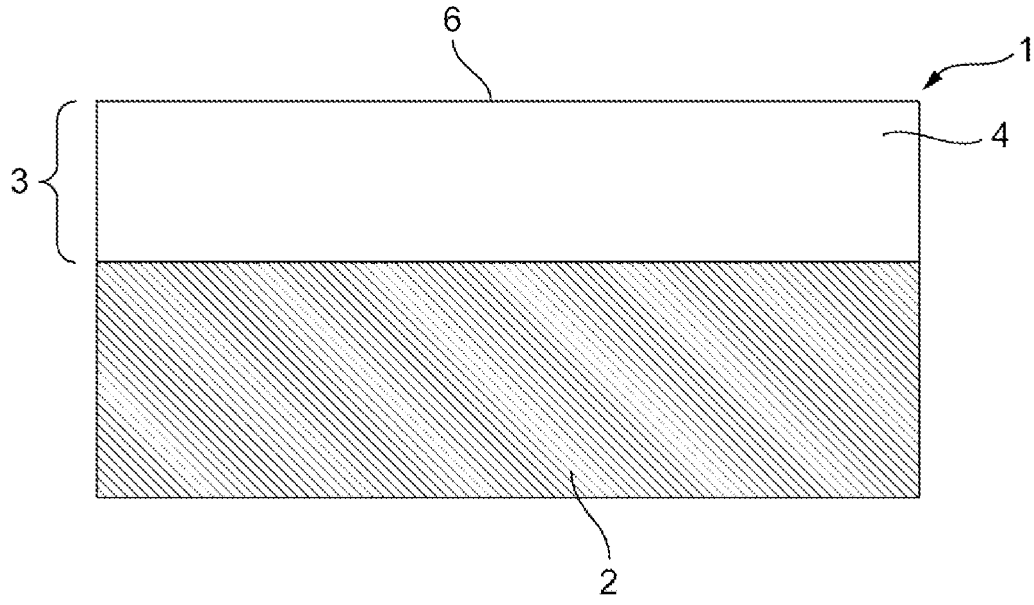
FIG. 1 is a schematic cross-sectional view of a sliding member according to one embodiment of the present invention.

FIG. 1 is a schematic cross-sectional view of the sliding member 1. The sliding member 1 includes a back metal layer 2 and a sliding layer 3. The sliding layer 3 includes a resin layer 4 containing a resin material, and an upper surface of the resin layer 4 exposed to the outside is a sliding surface 6. Although the sliding member 1 illustrated in FIG. 1 is formed into a flat shape, the shape of the sliding member 1 is not limited thereto, and may be a curved shape.

Figure 2:
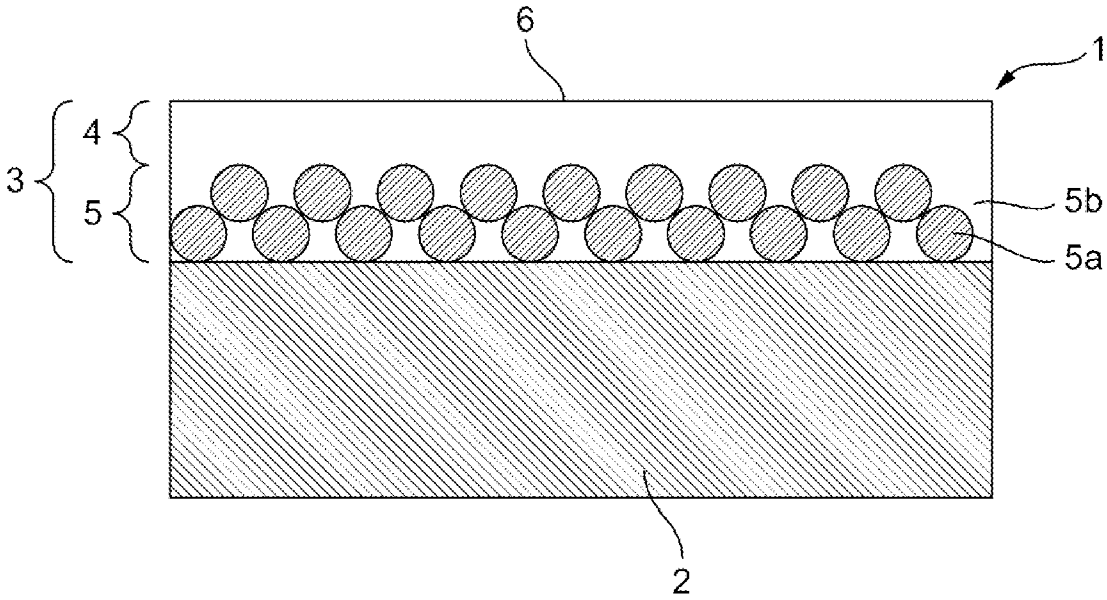
FIG. 2 is a schematic cross-sectional view of another sliding member according to one embodiment of the present invention.

FIG. 2 is a schematic cross-sectional view of another sliding member 1. The sliding member 1 includes a back metal layer 2 and a sliding layer 3. The sliding layer 3 includes a resin layer 4 and a metal layer 5. A porous metal material 5*a* of the metal layer 5 may have a spherical shape as illustrated in FIG. 2 or another shape. A resin material 5*b* with which the metal layer 5 is impregnated up to an upper surface thereof is further deposited on the metal layer 5 to form the resin layer 4. An upper surface of the resin layer 4 is a sliding surface 6 exposed to the outside. Although the sliding member 1 illustrated in FIG. 2 is formed into a flat shape, the shape may be a curved shape.

Figure 3:
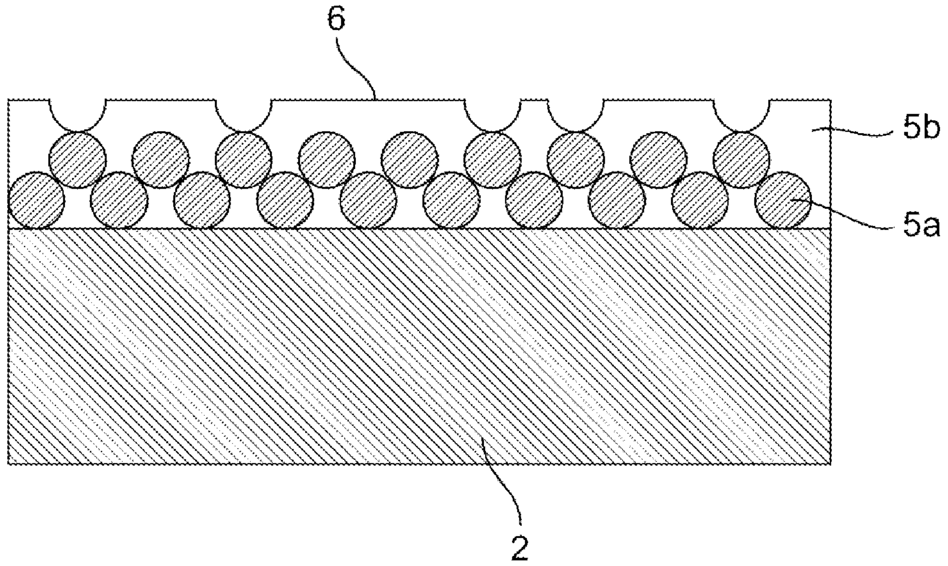
FIG. 3 is a schematic cross-sectional view of still another sliding member according to one embodiment of the present invention.
Figure 4:
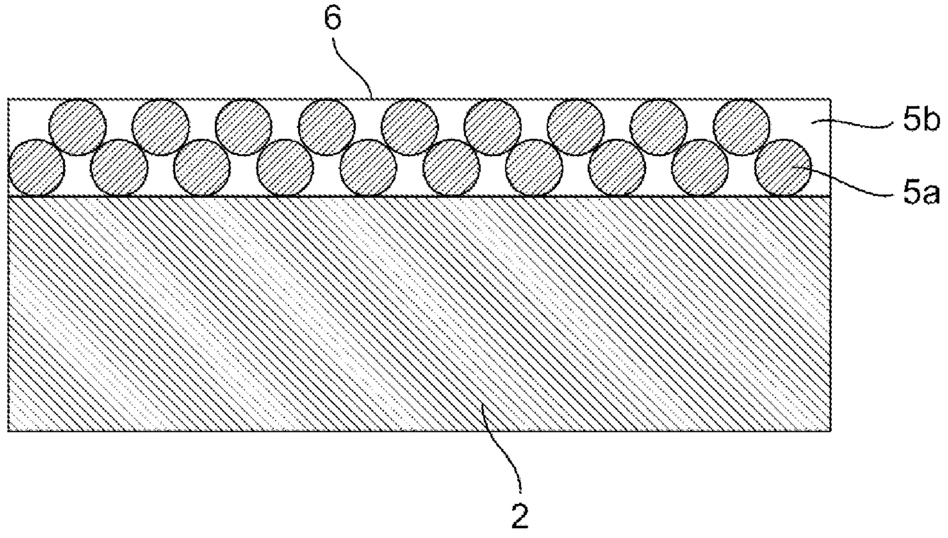
FIG. 4 is a schematic cross-sectional view of still another sliding member according to one embodiment of the present invention.

Although the metal layer 5 is completely covered with the resin layer 4 in FIG. 2, a part of the upper surface of the metal layer 5 may be exposed to the outside to be a part of the sliding surface 6. For example, as illustrated in FIG. 3, a part of the upper surface of the metal layer 5 may be exposed by forming a part of the resin layer 4 in a concave shape. Alternatively, an amount of the resin material 5*b* with which the porous metal material 5*a* is impregnated may be adjusted so that the porous metal material 5*a* is impregnated with the resin material 5*b* up to the height equivalent to that of the upper surface of the porous metal material 5*a* as illustrated in FIG. 4. In any case, in a case where the upper surface of the metal layer 5 is exposed, the height of the porous metal material 5*a* is preferably equivalent to or lower than the height of the upper surface of the resin layer 4. Both the upper surface of the metal layer 5 and the upper surface of the resin material 5*b* may have a flat shape or may be curved.

The sliding member 1 illustrated in FIGS. 1 to 4 has a two-layer structure in which the resin layer 4 is deposited on the back metal layer 2 or a three-layer structure in which the resin layer 4 and the metal layer 5 are deposited on the back metal layer 2, but the structure of the sliding member 1 of the present invention is not limited thereto. For example, in FIG. 2, in addition to the resin layer 4 and the metal layer 5, another resin layer and another metal layer may be provided on an opposite side of the back metal layer 2. In this case, the sliding member 1 includes the sliding surface on both surfaces thereof.

(Material of Sliding Member)

For the back metal layer 2, carbon steel, stainless steel, an aluminum alloy, a copper alloy and the like can be used. For the metal layer 5, a porous metal material made of a bronze based alloy, a brass based alloy, another copper alloy (Bi, Ni and the like) and the like can be used. As the resin material forming the resin layer 4 and the resin material with which the metal layer 5 is impregnated, a material obtained by using polytetrafluoroethylene (PTFE) as a base resin, adding a solid lubricant such as molybdenum disulfide ($MoS_2$), graphite, and boron nitride at a ratio of 1% to 20%, and adding hard particles such as alumina ($Al_2O_3$) at a ratio of 0% to 20% can be used.

(Thickness of Sliding Member)

In this embodiment, a thickness of the back metal layer 2 may be, for example, 0.3 to 3.5 mm. A thickness of the sliding layer 3 may be, for example, 0.1 to 0.7 mm in a case where the sliding layer 3 includes the resin layer 4 and the metal layer 5, and may be, for example, 0.1 to 0.5 mm in a case where the sliding layer 3 includes only the resin layer 4 and does not include the metal layer 5. In a case where the sliding layer 3 does not include the resin layer 4 but includes only the metal layer 5, a thickness of the metal layer 5 may be, for example, 0.1 to 0.4 mm. An average particle size of the metal layer 5 after sintering may be 30 to 110 μm.

(Method of Manufacturing Sliding Member)

The sliding member 1 is manufactured at following manufacturing steps.

(1) $MoS_2$ is added to PTFE at a mixing ratio n, and then stirred and mixed to prepare a resin material.

(2) A porous copper-tin alloy layer is provided on a surface of back metal made of carbon steel, and the resin material obtained at step (1) is applied thereto (member 10). This is rolled with a pressure roller to fill pores of the porous copper-tin alloy layer with the resin material, and form the resin layer 4 having a uniform thickness on a surface of the porous copper-tin alloy layer.

(3) The member obtained at step (2) is baked in a heating furnace and then cooled. Thereafter, this is processed into a predetermined dimension by a dimension adjusting roller.

(4) The member obtained at step (3) is formed into a cylindrical shape or a semicircular shape.

At step (1) described above, as the mixing ratio n of $MoS_2$ to PTFE is increased, Martens hardness of the resin layer 4 of the sliding member 1 increases. In order to set a static frictional force of the sliding surface 6, which is the upper surface of the resin layer 4, within a predetermined range, the Martens hardness of the resin layer 4 is desirably set to 25 to 45 $N/mm^2$.

Figure 5:
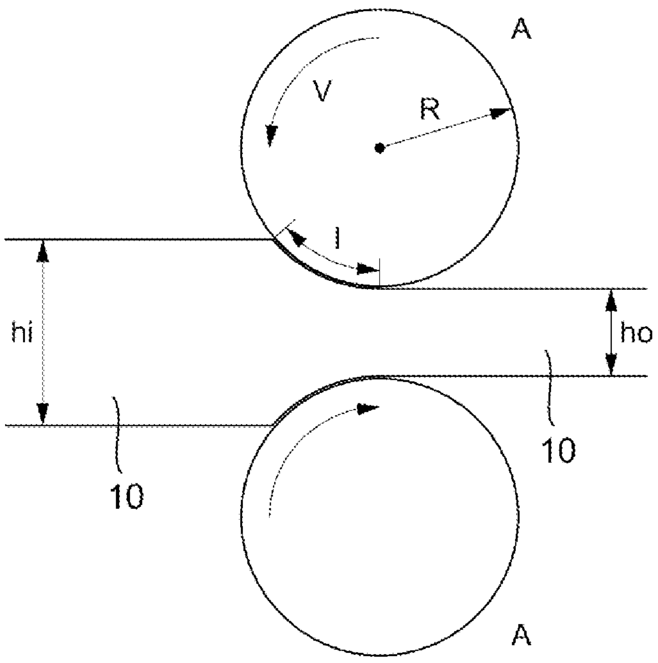
FIG. 5 illustrates a cross section of a member and a dimension adjusting roller in rolling according to one embodiment of the present invention.

FIG. 5 illustrates a cross section of the member and the dimension adjusting roller in rolling at step (3). The member 10 is interposed between two rollers A to be rolled. In FIG. 5, hi represents a plate thickness before rolling of the member 10, ho represents the plate thickness after rolling of the member, R represents a radius of the roller A, 1 represents a roll contact length, and V represents a speed of the roll surface. A rolling reduction ratio r of the member 10 is obtained as $r=(hi-ho)/hi$, and a deformation time t of the member 10 is obtained as $t=l/V$. Here, the roll contact length l may be obtained by using approximate expression $1=\sqrt{(R(hi-ho))}$. Although a creep deformation ratio is adjusted in a stage of processing into a predetermined dimension by the dimension adjusting roller at step (3) described above, another rolling step may be provided at step between step (3) and step (4) described above to adjust the creep deformation ratio.

The creep deformation ratio of the resin layer 4 of the sliding member 1 can be adjusted by changing the rolling reduction ratio r and the deformation time t of the member 10. When the creep deformation ratio of the resin layer 4 increases, a behavior of the resin layer 4 becomes viscoelastic, and a dynamic frictional force of the sliding surface 6 increases. In order to increase the dynamic frictional force of the sliding surface 6 to approach the static frictional force, the creep deformation ratio is set to 10% or larger. When the creep deformation ratio of the resin layer 4 is set to 15% or larger, the dynamic frictional force of the sliding surface 6 further increases. In contrast, when the creep deformation ratio of the resin layer 4 exceeds 30%, shape processing after the rolling becomes difficult. In a case where the sliding member 1 is used as a material of a shock absorber, the creep deformation ratio of the resin layer 4 is preferably set to 25% or smaller in order to secure a certain resin strength or larger.

When the member 10 is rolled, a molecular chain of the resin is cut, and a crack might occur inside the resin layer 4. In order to suppress such crack, it is preferable to set the rolling reduction ratio r to 5% to 8% and the deformation time t to 0.05 sec or longer. By performing the rolling under such a relatively mild condition, it is possible to keep the resin strength and the creep deformation ratio at a certain level or larger while suppressing the occurrence of crack inside the resin layer 4.

In this manner, in the sliding member 1, the Martens hardness and the creep deformation ratio of the resin layer 4 after the rolling can be changed by adjusting three parameters of the mixing ratio n of $MoS_2$ to PTFE of the resin layer 4, the rolling reduction rate r of the member 10, and the deformation time t.

(Method of Measuring Martens Hardness and Creep Deformation Ratio)

The Martens hardness and the creep deformation ratio of the sliding member 1 can be measured by a method of measuring conforming to the international standard ISO 14577 of micro indentation test. Using a Shimadzu Dynamic Ultra Micro Hardness Tester DUH-211 manufactured by Shimadzu Corporation as a test apparatus, the test was performed in a cross-sectional direction of the resin layer 4 with a maximum test force of 5 mN and a holding time of 60 seconds. The Martens hardness and the creep deformation ratio did not significantly change before and after the shape adjustment at manufacturing step (4) described above.

Martens hardness HM is obtained as HM=P/A from a test load P and a surface area A in which an indenter penetrates.

Figure 6:
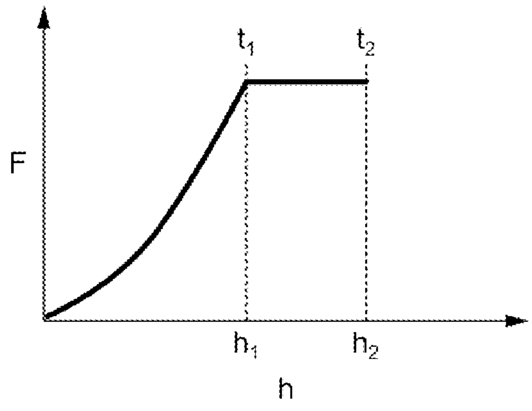
FIG. 6 illustrates a result of a creep test according to one embodiment of the present invention.

A result of the creep test is illustrated in FIG. 6. Reference signs in FIG. 6 are as follows.

Abscissa (h): depth

Ordinate (F): load $t_1$: start of holding $t_2$: end of holding $h_1$: displacement when test load is reached $h_2$: displacement after holding The creep deformation ratio C (%) is obtained as $C=(h_2-h_1)/h_1\times100$.

EXAMPLES (Performance Evaluation Test)

In order to evaluate the static frictional force, the dynamic frictional force, and a change rate of the static frictional force and the dynamic frictional force of the sliding member according to the present invention, a performance evaluation test was performed for Examples 1 to 6 and Comparative Examples 1 to 4.

Figure 7:
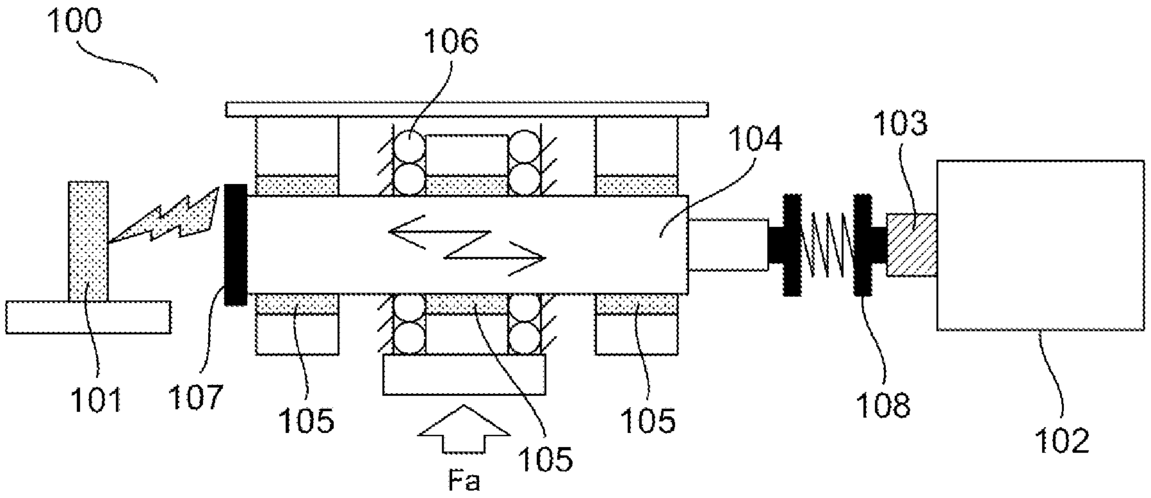
FIG. 7 is a schematic cross-sectional view of a performance evaluation tester according to one embodiment of the present invention.

FIG. 7 is a schematic cross-sectional view of a performance evaluation tester 100. The tester 100 includes a laser displacement meter 101, a ball screw motor 102, a load cell 103, a test shaft 104, a test bushing 105, a vertical guide 106, a reflector 107, and a spring 108. The test bushing 105 is obtained by processing the sliding member manufactured at manufacturing steps (1) to (4) described above into a cylindrical shape having an inner diameter of 22 mm and an axial length of 15 mm. The test bushing 105 was incorporated in the tester 100, the test bushing 105 was reciprocally slid in a horizontal direction in a state in which a load Fa was applied vertically upward from below, and a horizontal movement distance of the test bushing 105 was measured by the laser displacement meter 101.

(Test Conditions)

Load: 490 N

Sliding speed: 1 mm/sec

Stroke: 15 mm

Lubricating oil: oil for shock absorber

Static frictional force: calculated by adding a maximum value of a forward route and that of a backward route and dividing the same by two Dynamic frictional force: calculated by adding frictional forces of the forward route and the backward route at the stroke center point and dividing the same by two Change Rate (%): (static frictional force−dynamic frictional force)/static frictional force×100

Manufacturing conditions and test results of Examples 1 to 6 and Comparative Examples 1 to 4 are illustrated in Tables 1 and 2. The "Static Frictional Force" in Table 2 was evaluated as "Y" in a case where a value thereof was in a range of 30 N or larger and 60 N or smaller, and was evaluated as "N" in a case where the value was out of the range. The "Change Rate" was evaluated as "Excellent" in a case where a ratio of a difference between the static frictional force and the dynamic frictional force to the static frictional force was 13% or smaller, evaluated as "Good" in a case where the ratio was 13% to 15%, and evaluated as "Poor" in a case where the ratio was larger than 15%. In Comparative Example 4, evaluation could not be performed because the resin layer was peeled off when the test piece was processed into a cylindrical shape.

TABLE 1

| Manufacturing Condition | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Addition Ratio of $MoS_2$ (vol %) | 5 | 8 | 12 | 15 | 8 | 8 | 1 | 20 | 15 | 1 |
| Rolling Reduction Ratio (%) | 5 | 8 | 5 | 6 | 5 | 8 | 6 | 6 | 3 | 10 |

TABLE 1-continued

| Manufacturing Condition | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Deformation Time (s) | 0.07 | 0.57 | 0.07 | 0.5 | 0.11 | 0.28 | 0.5 | 0.5 | 0.04 | 0.65 |

TABLE 2

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Martens Hardness ($N/mm^2$) | 25 | 30 | 40 | 45 | 30 | 30 | 20 | 47 | 45 | 20 |
| Creep Deformation Ratio (%) | 10 | 30 | 10 | 20 | 15 | 25 | 20 | 20 | 8 | 33 |
| Static Frictional Force | Y | Y | Y | Y | Y | Y | N | N | Y | — |
| Change Rate | Good | Good | Good | Excellent | Excellent | Excellent | Excellent | Excellent | Poor | — |

As illustrated in Table 2, in Examples 1 to 6, magnitude of the static frictional force and the change rate of the static frictional force and the dynamic frictional force are values within the standard. In Comparative Example 1, the Martens hardness is small, and the static frictional force is out of the standard. In Comparative Example 2, the Martens hardness is large, and the static frictional force is out of the standard. In Comparative Example 3, the creep deformation ratio is small, and the change rate is out of the standard.

In this manner, it was found that, by setting an addition ratio of $MoS_2$ to the resin layer to 5% to 15%, the rolling reduction ratio to 5% to 8%, and the deformation time to 0.05 seconds or longer, the sliding layer having the Martens hardness of 25 to 45 $N/mm^2$ and the creep deformation ratio of 10% to 30% can be obtained, and the change rate of the static frictional force and the dynamic frictional force can be kept within a desired range.

Although the embodiments and examples of the present invention are described in detail with reference to the drawings and in connection with the performance evaluation test, the specific configurations are not limited thereto, and variations not departing from the gist of the present invention recited in claims are included in the present invention.

The invention claimed is:

1. A sliding member comprising:
a back metal layer; and
a sliding layer, wherein
the sliding layer contains a resin material,
a surface of the sliding layer is an exposed sliding surface, and
the sliding layer has Martens hardness of 25 to 45 $N/mm^2$ and a creep deformation ratio of 10% to 30%.

2. The sliding member according to claim 1, wherein the sliding layer contains porous metal, and pores of the porous metal are impregnated with the resin material.

3. The sliding member according to claim 2, wherein the porous metal is exposed on the sliding surface of the sliding layer.

4. The sliding member according to claim 2, wherein the porous metal is not exposed on the sliding surface of the sliding layer.

5. The sliding member according to claim 1, wherein the sliding layer further contains a hard particle.

6. The sliding member according to claim 1, wherein the sliding layer further contains a solid lubricant.

7. The sliding member according to claim 1, wherein the resin material is made of polytetrafluoroethylene (PTFE).

8. The sliding member according to claim 5, wherein the hard particle contains alumina ($Al_2O_3$).

9. The sliding member according to claim 6, wherein the solid lubricant contains molybdenum disulfide ($MoS_2$).

10. The sliding member according to claim 1, wherein the sliding layer has a thickness of 0.1 to 0.7 mm.

11. The sliding member according to claim 2, wherein the porous metal has an average particle size of 30 to 110 μm.

12. The sliding member according to claim 1, wherein the back metal layer has a thickness of 0.3 to 3.5 mm.

13. The sliding member according to claim 1, wherein the creep deformation ratio of the sliding layer is 15% to 25%.

* * * * *